(12) United States Patent
Sakaguchi

(10) Patent No.: US 7,080,128 B2
(45) Date of Patent: Jul. 18, 2006

(54) INTER-PROCESSOR COMMUNICATION METHOD USING A DISK CACHE IN A NETWORK STORAGE SYSTEM

(75) Inventor: Akihiko Sakaguchi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 359 days.

(21) Appl. No.: 10/638,310

(22) Filed: Aug. 12, 2003

(65) Prior Publication Data

US 2004/0243687 A1  Dec. 2, 2004

(30) Foreign Application Priority Data

May 29, 2003  (JP) .............................. 2003-151790

(51) Int. Cl.
*G06F 12/02*  (2006.01)

(52) U.S. Cl. ...................... 709/213; 711/129; 711/130; 711/147; 711/153; 709/214; 709/215

(58) Field of Classification Search ................ 709/213, 709/129, 130, 147, 153; 703/201, 205, 212; 710/3–5, 21, 22, 33, 52, 56, 106, 147, 173; 714/10; 711/104, 112, 129, 153, 147, 214, 711/215

See application file for complete search history.

(56) References Cited

U.S. PATENT DOCUMENTS

| 4,564,900 | A | | 1/1986 | Smitt |
| 5,263,142 | A | | 11/1993 | Watkins et al. |
| 5,437,047 | A | * | 7/1995 | Nakamura ................... 709/201 |
| 5,446,841 | A | * | 8/1995 | Kitano et al. ............... 709/213 |
| 5,920,893 | A | * | 7/1999 | Nakayama et al. .......... 711/147 |
| 5,924,097 | A | * | 7/1999 | Hill et al. .................... 707/10 |
| 6,018,763 | A | * | 1/2000 | Hughes et al. ............... 709/213 |
| 6,055,605 | A | * | 4/2000 | Sharma et al. .............. 711/130 |
| 6,088,771 | A | * | 7/2000 | Steely et al. ................ 711/154 |
| 6,108,693 | A | * | 8/2000 | Tamura ....................... 709/213 |
| 6,108,737 | A | * | 8/2000 | Sharma et al. .............. 710/107 |

(Continued)

FOREIGN PATENT DOCUMENTS

JP          2002-23958          7/2000

OTHER PUBLICATIONS

International Business Machines, Parallel System Support, "Managing Shared Disks", Version 3, Release 2, Apr. 2000, pp. 1-2.

(Continued)

*Primary Examiner*—Tuan V. Thai
*Assistant Examiner*—Thanh D. Vo
(74) *Attorney, Agent, or Firm*—Reed Smith LLP; Stanley P. Fisher, Esq.; Juan Carlos A. Marquez, Esq.

(57) ABSTRACT

When communications among a plurality of processors employed in a network storage system are required, any of the processors initiating a communication on the transmission side issues a request to an I/O processing apparatus, which is used for controlling a disk unit and a disk cache common to the processors, in order to allocate an area in the common disk cache as a communication buffer. At such a request, the I/O processing apparatus allocates a specific area in the common disk cache as a communication buffer and gives a notice of the allocation to the requesting processors on the transmission side. Receiving the notice, the transmission-side processors write data to be transferred into the specific area of the disk cache and, then, the reception-side processors fetch the transferred data from the specific area.

5 Claims, 6 Drawing Sheets

U.S. PATENT DOCUMENTS

| | | | |
|---|---|---|---|
| 6,112,281 A * | 8/2000 | Bamford et al. | 711/141 |
| 6,212,610 B1 * | 4/2001 | Weber et al. | 711/164 |
| 6,253,290 B1 * | 6/2001 | Nakamoto | 711/138 |
| 6,381,674 B1 | 4/2002 | DeKoning et al. | |
| 6,449,699 B1 | 9/2002 | Franke et al. | |
| 6,754,785 B1 | 6/2004 | Chow et al. | |
| 6,813,684 B1 * | 11/2004 | Sakaguchi et al. | 711/113 |
| 2002/0004845 A1 | 1/2002 | Yamamoto et al. | |
| 2002/0062352 A1 * | 5/2002 | Asano et al. | 709/212 |
| 2002/0069334 A1 | 6/2002 | Hsia et al. | |
| 2002/0116469 A1 * | 8/2002 | Okuyama | 709/213 |
| 2002/0174258 A1 * | 11/2002 | Dale et al. | 709/312 |
| 2002/0184328 A1 * | 12/2002 | Richardson et al. | 709/213 |
| 2002/0198953 A1 * | 12/2002 | O'Rourke et al. | 709/213 |
| 2003/0005071 A1 * | 1/2003 | Kanoh | 709/213 |
| 2003/0088636 A1 * | 5/2003 | Nakamura | 709/213 |

OTHER PUBLICATIONS

International Business Machines, Parallel System Support, "Managing Shared Disks—Table of Contents", Version 3, Release 2, Apr. 2000, pp. 1-5.

International Business Machines, Parallel System Support, "Managing Shared Disks—Tuning Virtual Shared Disk Performance", Version 3, Release 2, Apr. 2000, pp. 1-7.

* cited by examiner

INTER-PROCESSOR COMMUNICATION METHOD USING A DISK CACHE IN A NETWORK STORAGE SYSTEM

FIELD OF THE INVENTION

The present invention relates to a communication method for carrying out secure communications among a plurality of processors employed in a storage system.

BACKGROUND OF THE INVENTION

In order to satisfy a high-reliability requirement, a storage system designed for business applications may be provided with a plurality of processors for issuing IO requests to a control processing apparatus, which is used for controlling disks, on the basis of the requests received from clients. These processors supervise each other. If a failure occurs in one of the processors, another processor serves as a substitute for the failing processor, doing jobs supposed to be done by the failing processor so that the storage system is capable of continuing its normal operations. In the mutual supervision among the processors, communications referred to as heart beats are generally carried out to periodically exchange information such as the present time. When a response in a heart-beat communication is lost for a predetermined period of time, the processor not giving the response is considered to be in a down state. In this case, a transfer of jobs is made. In addition, exchanges of information are not limited to the heart-beat communications. For example, a lot of data known as system configuration information is communicated among internal processors. In these communications, data is generally exchanged by way of an external network. There is a method of carrying out internal communications by using an internal network instead of an external network. It is difficult, however, to lay a internal network capable of operating at a very high speed due to space problems.

By the way, if an external network is used for inter-processor communications in a storage system employing a plurality of processors as described above, communicated data may inevitably flow to an undesirable external destination, making the communications between the processors prone to problems of security. If an external network is not used, on the other hand, it is necessary to specially connect a dedicated network inside the storage system. However, such an internal network incurs a cost that would otherwise be not required.

It is thus an object of the present invention to implement secure communications for exchanging data by way of a disk cache, which can be accessed by a plurality of processors as a cache common to the processors, with neither using an external network nor newly laying a dedicated network.

Japanese Patent Laid-open No. 2002-23958 discloses a conventional technology for carrying out communications among a plurality of processors by way of a disk cache. In accordance with a communication technique based on this conventional technology, a mainframe host places communicated information in the disk cache and an open system host fetches the information from the disk cache. In this communication technique, the mainframe host and the open system host pertain to different systems. This communication technique may raise a problem of security in that the open system host is connected to the disk cache by an external network. In addition, communications can be carried out only on the direction from the mainframe host to the open system host so that duplex communications are impossible.

SUMMARY OF THE INVENTION

In order to solve the problems described above, the present invention proposes a communication method, which is to be adopted in a computer system including a plurality of CPUs and a shared memory accessible to the CPUs and comprises the steps of:

allocating a portion of the shared memory as a communication buffer;

forming a judgment as to whether or not any of the CPUs has stored data being transferred in the communication buffer;

letting any of the CPUs store data being transferred in the communication buffer if no data being transferred has been stored in the communication buffer;

letting any of the CPUs fetch data being transferred from the communication buffer if the data being transferred has been stored in the communication buffer; and putting the communication buffer in status of no stored data being transferred after any of the CPUs fetches data being transferred from the communication buffer.

For example, it is desirable to employ a disk cache as the shared memory. In this present invention, a portion of the shared memory is allocated as a communication buffer, which is managed typically as sets each comprising a data transfer area and a transfer flag area. The data transfer area is used for storing data to be transferred from one of the CPUs to another. On the other hand, the transfer flag area is used for storing a flag indicating whether or not data to be transferred has been stored in the data transfer. Typically, the flag is reset to 0 in the transfer flag area to indicate that no data to be transferred has been stored in the data transfer area. On the other hand, the flag is set at 1 in the transfer flag area to indicate that any of the CPUs has stored data being transferred in the data transfer area and no other one of the CPUs has fetched the data from the data transfer area. As any other one of the CPUs fetches the data being transferred from the data transfer area, the flag is reset to 0 in the transfer flag area. That is to say, in this embodiment, a flag is set at 1 in the transfer flag area to indicate that any of the CPUs has stored data being transferred in the data transfer, or reset to 0 to indicate that no data to be transferred has been stored in the data transfer area and, hence, any one of the CPUs is allowed to use the data transfer area as an available communication-buffer area.

In an attempt to transfer data from one of the CPUs to another, first of all, the shared memory is searched for a data transfer area that can be used for storing the data to be transferred. In the embodiment described above, the shared memory is searched for a data transfer area associated with a transfer flag area with the flag thereof reset at 0. Then, the data to be transferred is stored in the data transfer area associated with the transfer flag area with the flag thereof reset at 0, and the flag is set to 1. By checking a flag in this way, data to be transferred can be prevented from being stored into a data transfer area over other data already existing in the data transfer area. The flag in each transfer flag area is checked periodically or in accordance with the issuance of a predetermined instruction. If the flag in a transfer flag area is 1, a transfer-destination CPU fetches data being transferred from the data transfer area associated with the transfer flag area. After the transfer-destination CPU fetches the data being transferred from the data transfer area, the flag is reset to 0 to indicate that the data transfer area is a cleared communication-buffer area.

The operations described above can be carried out by execution of software in a CPU or an I/O processor. As an alternative, dedicated hardware is employed as a substitute for such a CPU or such an I/O processor.

An information-processing apparatus implemented as another embodiment of the present invention comprises:

two or more CPUs each used for issuing I/O instructions;

a disk apparatus, which can be accessed directly or indirectly by the CPUs;

a disk cache for storing a copy of at least a part of data stored in the disk apparatus; and an I/O processor for controlling the disk apparatus and the disk cache, wherein:

the CPUs each have a function for issuing a request to the I/O processor to allocate a partial area of the disk cache;

the I/O processor has a function to allocate a partial area of the disk cache as a communication buffer upon reception of a request to allocate said partial area; and there is provided a communication means used by any particular one of the CPUs to write data into the communication buffer and by any of the CPUs other than the particular CPU to fetch the data.

The communication means comprises:

a sub-means for forming a judgment as to whether or not data to be transferred has been stored in the communication buffer;

a sub-means for letting any of the CPUs store data being transferred in the communication buffer if no data to be transferred has been stored in the communication buffer;

a sub-means for letting any of the CPUs fetch data being transferred from the communication buffer if the data being transferred has been stored in the communication buffer; and a sub-means for clearing the communication buffer.

The disk cache is a high-speed memory used for storing most recent data so as to increase the access performance of a disk I/O operation carried out by a processor. Since most recent data is stored in the disk cache, an access to the disk cache is made when a processor carries out a disk I/O operation to access the most recent data. In an I/O operation, it is impossible to specify an address in the disk cache, at which data is to be written or from which most recent data is to be fetched. In an embodiment of the present invention, however, by issuing a special command to a disk control processor, an access to a specific area of the disk cache can be made without accessing the disk. From the specific area, a reception-side processor typically fetches data being transferred, which has been written by a transmission-side processor into the specific area. Thus communications are carried out among a plurality of processors. As a result, a secure communication can be carried out at a high speed.

PREFERRED EMBODIMENTS OF THE INVENTION

First Embodiment

Figure 1:
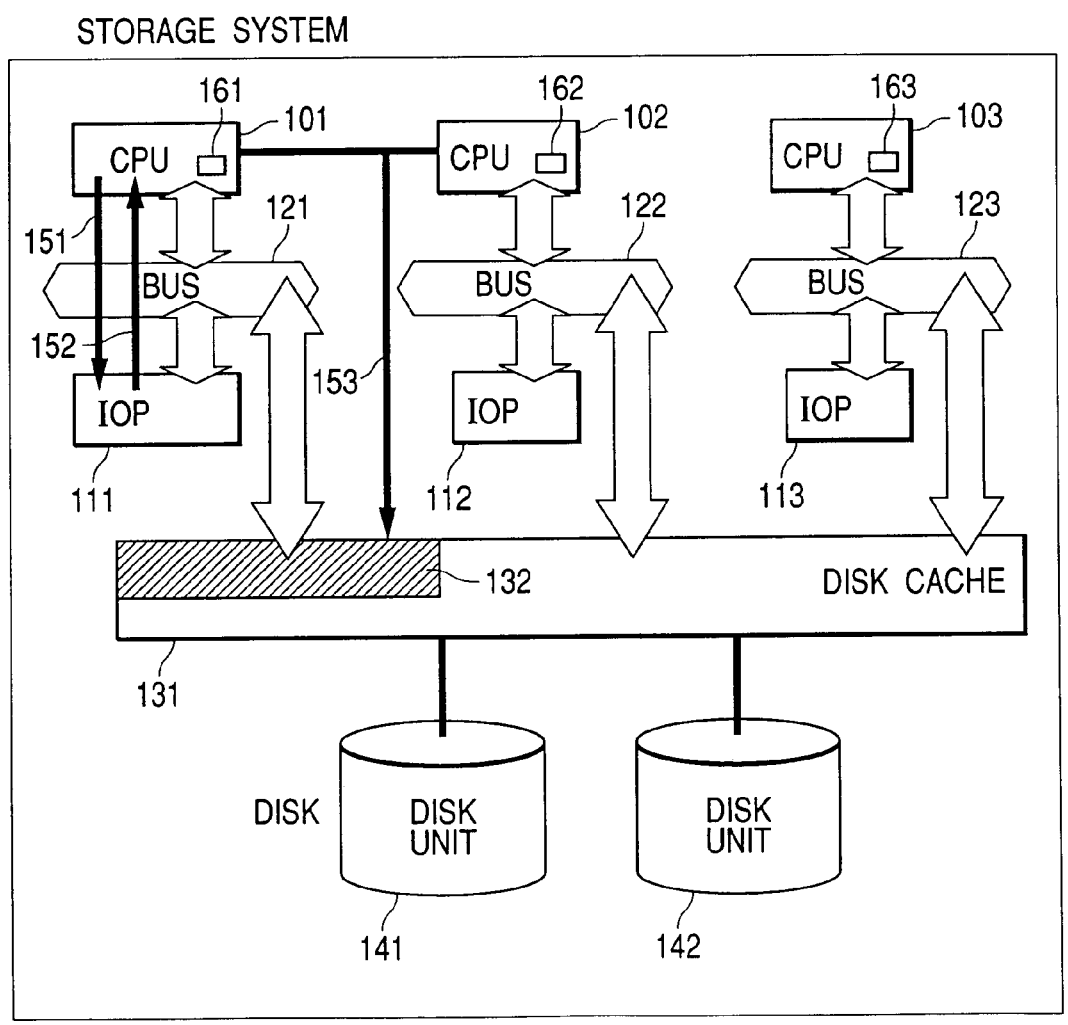
FIG. 1 is a block diagram showing an embodiment of the present invention in a simple manner.

FIG. 1 is a block diagram showing the configuration of a storage system implemented by a first embodiment of the present invention. CPUs 101 to 103 each have a file system. The CPUs 101 to 103 are connected to I/O processors (IOPs) 111 to 113 which control disc and disc cache respectively by I/O buses 121 to 123 respectively so that the CPUs 101 to 103 are capable of issuing I/O requests to the IOPs 111 to 113 respectively. A disk cache 131 is a cache common to a plurality of disks 141 and 142 and connected to the CPUs 101 to 103 by the I/O buses 121 to 123 respectively. The CPUs 101 to 103, the IOPs 111 to 113, the I/O buses 121 to 123, the disk cache 131 and the disks 141 and 142 form a storage system.

When receiving an I/O request from the CPU 101, 102 or 103, the IOP 111, 112 or 113 respectively makes an access to the disk cache 131 or, if necessary, makes an access to the disks 141 and/or 142 and executes cache control. Also in this case, the CPU 101, 102 or 103 is not capable of specifying a specific area in the disk cache 131 in order to make a direct access to the area.

In making such an I/O request, first of all, a CPU initiating a communication with another CPU issues a request to an IOP associated with the initiating CPU to request the IOP that a partial area of the disk cache 131 be allocated. In the storage system shown in FIG. 1, for example, the CPU 101 issues a request 151 to the IOP 111. When receiving the request, the IOP 111 maps a partial area 132 of the disk cache 131 onto an area of the memory space of the CPU 101. To put it concretely, the IOP 11 transmits a response 152 to the CPU 101 making the request, informing the CPU 101 of the address of the mapped area 132. The CPU 101 catalogs the informed address of the partial area 132 in an address transformation table 161 for storing information on mapping of logical addresses in the address space of the CPU 101 onto physical addresses in an internal memory of the CPU 101. The address transformation table 161 is thus referred to in transforming a specific logical address specified by the CPU 101 into a physical address in the mapped partial area 132 of the disk cache 131. With the address of the partial area 132 of the disk cache 131 cataloged in the address transformation table 161, the CPU 101 is allowed to make a direct access to the partial area 132 of the disk cache 131. By the same token, the other CPUs 102 and 103 issue requests to their respective IOP 112 and 113 to request the IOPs 112 and 113 that partial areas of the disk cache 131 be allocated. As responses to the requests are received, the addresses of the allocated partial areas are cataloged in the address transformation tables 162 and 163 so that the other CPUs 102 and 103 are capable of making direct accesses to the allocated partial areas of the disc cache 131. A communication 153 between the CPUs such as the CPUs 101 and 102 is carried out as follows. The CPU 102 fetches data, which has been written by the CPU 101 into a specific area in the disk cache 131, from the specific area. That is to say, the communication 153 can be implemented by using the specific area as a communication buffer. In the implementation of the communication 153, it is not necessary to copy the data from the disc cache 131 to the disks 141 and/or 142.

Figure 2:
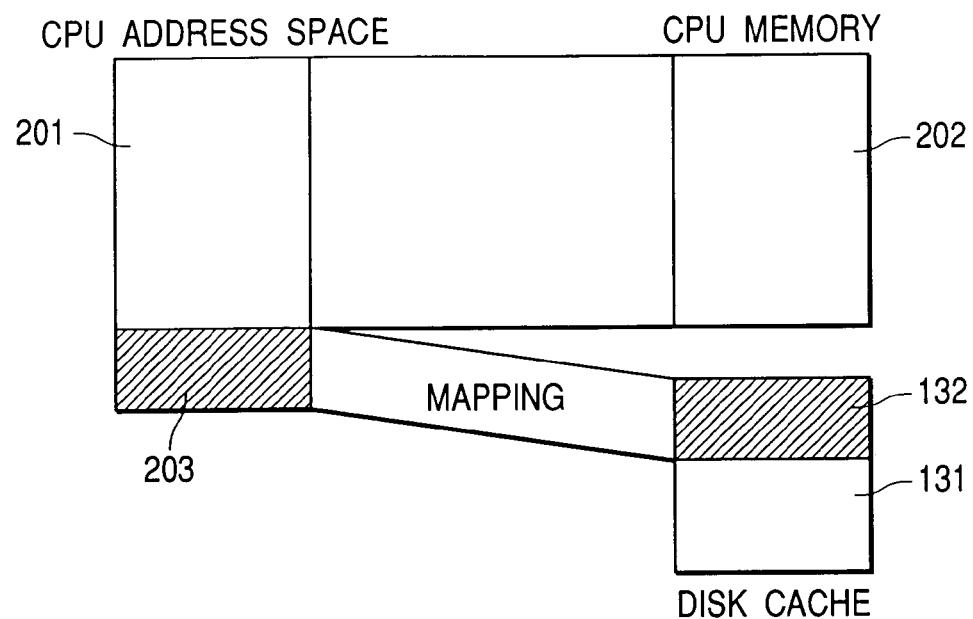
FIG. 2 is a diagram showing the concept of mapping an area in a disk cache onto an area of a CPU address space.

FIG. 2 is a diagram showing an outline of the address space of a CPU. The address space 201 of any specific one of the CPUs 101 to 103 can be regarded as a set of addresses in a memory area 202 of the specific CPU 101, 102 or 103. When the CPU 101, 102 or 103 issues a request to their respective IOP 111, 112 or 113 to request the IOP 111, 112 or 113 that a partial area of the disk cache 131 be allocated, a partial area 132 is mapped onto a partial area 203 of the address space 201. With such mapping set, the CPU 101, 102 or 103 is capable of directly writing data into and directly reading out data from the partial area 132 of the disk cache 131 by making an access to the partial area 203 of the address space 201. In order for the CPU 101, 102 or 103 to make a direct access to the disk cache 131 without going through their respective IOP 111, 112 or 113, the CPU 101, 102 or 103 issues a command to make an access to its memory in place of a disk I/O command to make an access to the disk cache 131. By issuing a command to write data into the memory, the data is stored into the disk cache 131 without being copied to the disks 141 and/or 142. In addition, the disk cache's partial area 132, which can be accessed by the CPUs 101 to 103, cannot be used as a target cache area of a disk I/O operation.

In the embodiment explained by referring to FIGS. 1 and 2, by mapping a partial area of the disc cache onto an area in the address space of a CPU, the CPU is capable of directly writing data into and directly reading out data from the partial area of the disk cache. By adoption of another technique, a CPU is also capable of making an access to a specific area of the disc cache in an operation. That is to say, in accordance with a method shown in FIG. 3, the disk cache's address used in a communication is specified in a transfer of data by a DMA (Direct Memory Access). To put it in detail, for example, the CPU 101 issues a special I/O command 301 to the IOP 111 to request the IOP 111 that a partial area of the disk cache 131 be allocated as a communication area. In a disk storage system, normally, an I/O command is issued to an I/O processor to make an access to a disk. In accordance with a method shown in FIG. 3, however, a special I/O command for a transfer of data between CPU in place of an access to a disk is defined and the special I/O command is used in place of an I/O command for an access to a disk. Receiving the special I/O command, the IOP 111 allocates a partial area 132 of the disk cache 131 as a communication area and, then, gives a response 302 to the CPU 101 to inform the CPU 101 of the allocated partial area's address and size. Thereafter, the CPU 101 is capable of using the partial area allocated as a communication area with a high degree of freedom. That is to say, the CPU 101 is capable of transferring data by making a DMA 303 specifying the address and the size. The partial area allocated as a communication area is either a special area not used as a cache area for a disk I/O operation or an ordinary area. If the partial area allocated as a communication area is an ordinary area, the IOP 111 must execute control so as to prevent the partial area from being used thereafter as a cache area.

Figure 3:
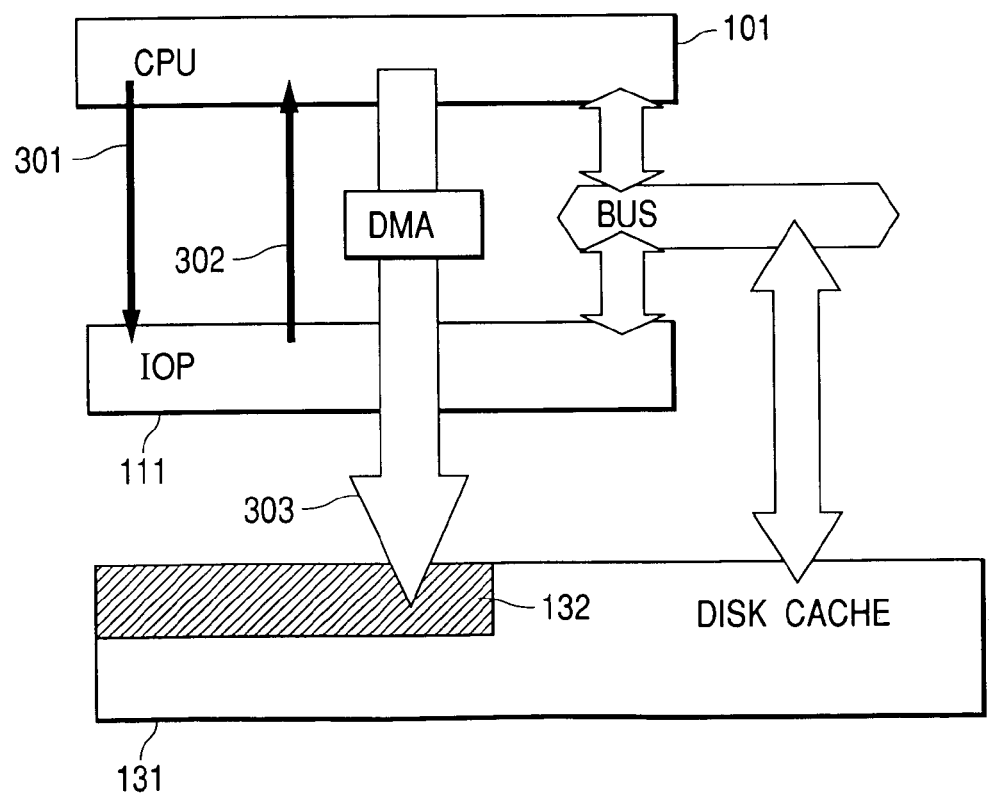
FIG. 3 is a block diagram showing a DMA technique for making an access to the disk cache.
Figure 4:
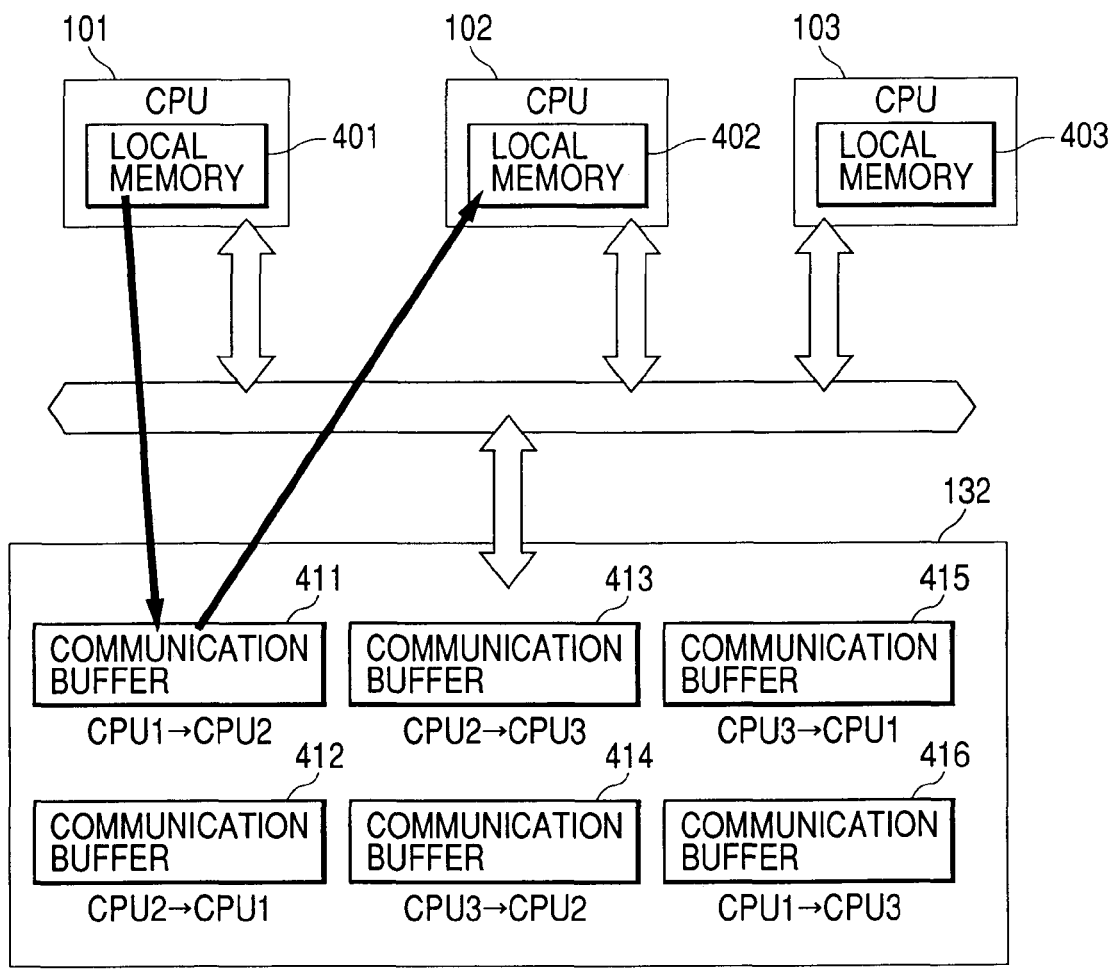
FIG. 4 is a block diagram showing a data transfer method according to the embodiment.

FIG. 4 is a diagram showing an outline of an inter-CPU communication common to the method explained by referring to FIGS. 1 and 2 and the method explained by referring to FIG. 3. Communication buffers 411 to 416 are provided in the disc cache's area 132, which can be accessed by a CPU. In this embodiment, in order to allow each CPU to carry out a duplex communication, a communication buffer is provided for each simplex communication. For example, data is transferred from the CPU 101 to the CPU 102 by way of the communication buffer 411. To put it in detail, the CPU 101 writes the transferred data 401 into the communication buffer 411 and, then, the CPU 102 fetches the data 401 from the communication buffer 411, storing the data 401 in a reception area 402.

Figure 5:
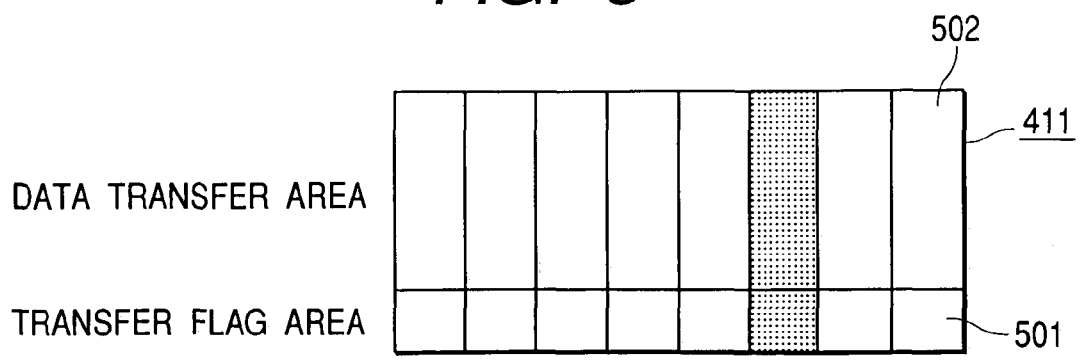
FIG. 5 is a diagram showing the configuration of a message queue in the disk cache.

FIG. 5 is a diagram showing the concept of a communication buffer. As shown in FIG. 5, the communication buffer is a multi-slot message queue. The slots of the message queue are sequentially used in a round-robin manner starting with the first slot. Each of the message-queue slots comprises a transfer flag area 501 and a data transfer area 502 for storing data being transferred. The transmission-side CPU 101 stores data to be transferred in the data transfer area 502 after verifying that the flag in the transfer flag area 501 has been reset. After the data to be transferred is stored in the data transfer area 502, the flag in the transfer flag area 501 is set. Then, the reception-side CPU 102 searches the message queue for a slot including a transfer flag area 501 having its flag set and fetches the data being transferred from the data transfer area 502 associated with the transfer flag area 501, storing the data into the reception area 402. Upon completion of the operation to fetch the data being transferred from the data transfer area 502, the reception-side CPU 102 resets the flag in the transfer flag area 501. Since the slots of the message queue are sequentially used, starting with the first slot as described above, the position of the transfer flag area 501, the flag of which is to be checked to verify the status of the data transfer area 502, is determined univocally if the transmission-side and reception-side CPUs each store the position of a slot just used thereby.

Figure 6:
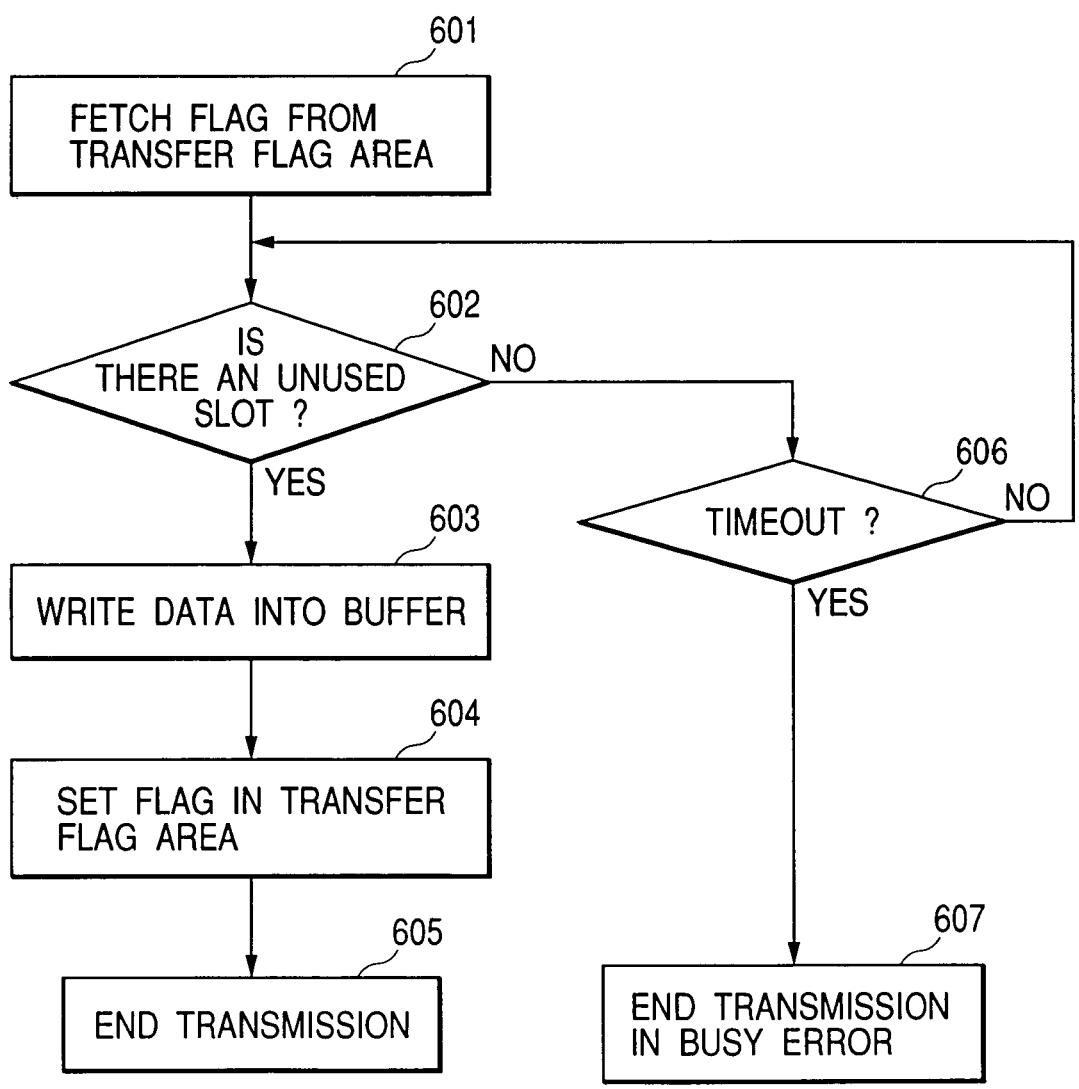
FIG. 6 shows a flowchart representing a transmission process carried out in the embodiment.

FIG. 6 shows a flowchart representing a transmission process carried out in the embodiment. At a step 601, the transmission-side CPU fetches flags from the transfer flag areas and, at the next step 602, verifies the utilization status of the message queue. If all the slots of the message queue are used, the flow of the transmission process goes on to a step 606 to enter a timeout state of waiting for a slot in the message queue to become available. If no slot of the message queue becomes available during the timeout period, the flow of the transmission process goes on to a step 607 at which the process is ended in an erroneous state due to a busy network. If a verification result obtained at the step 602 indicates that an available slot is found, on the other hand, the flow of the transmission process goes on to a step 603 at which the data to be transferred is written into the available slot. Then, at the next step 604, the flag of the transfer flag area is set after the data to be transferred is written into the available slot. Finally, at the last step 605, the transmission process is ended.

Figure 7:
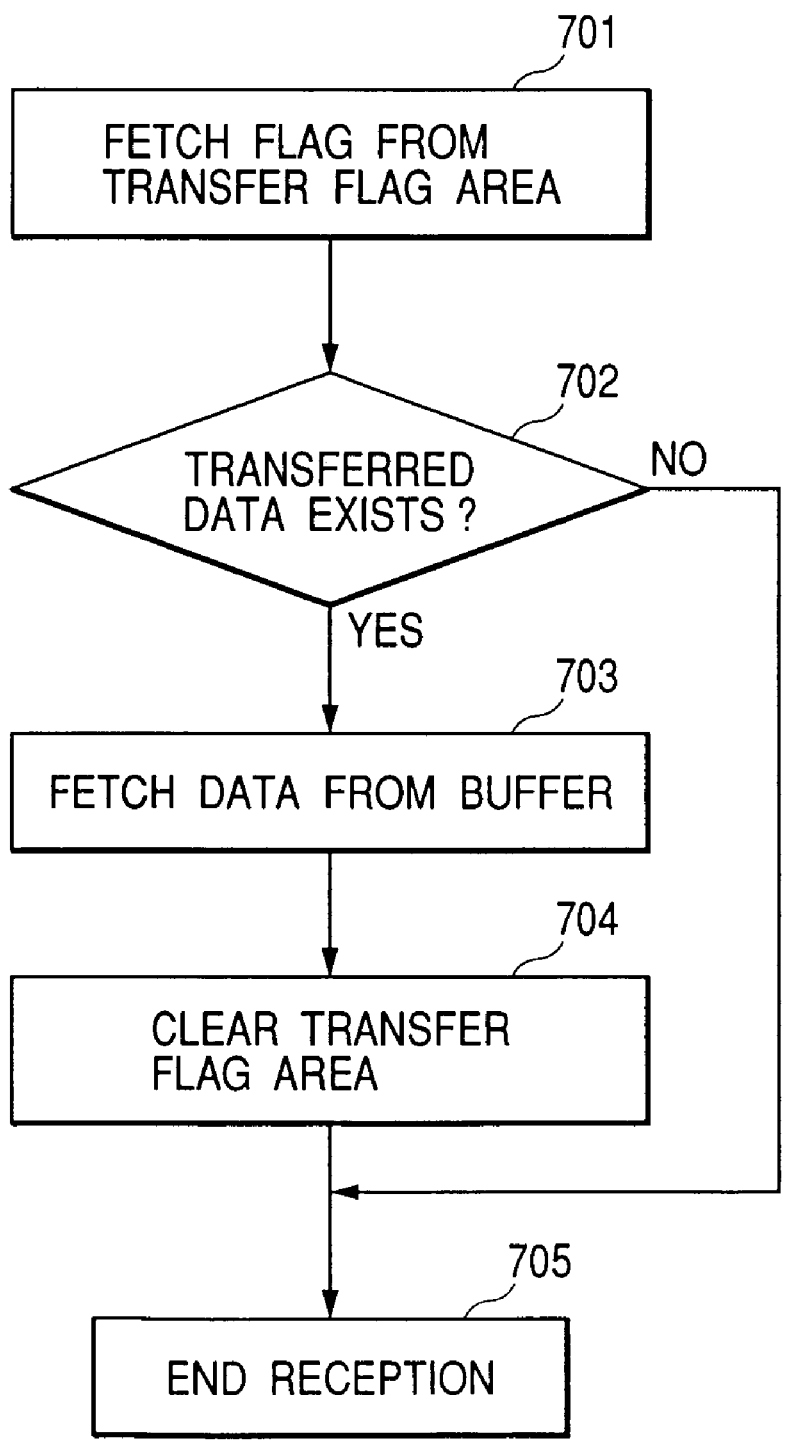
FIG. 7 shows a flowchart representing a reception process carried out in the embodiment.

FIG. 7 shows a flowchart representing a reception process carried out in the embodiment. At a step 701, the reception-side CPU fetches flags from the transfer flag areas and, at the next step 702, forms a judgment as to whether or not data being transferred has been written into the message queue. If no transfer flag has been set, the flow of the reception process goes on to a step 705 at which the process is ended without doing anything. If a transfer flag has been set, on the other hand, the flow of the reception process goes on to a step 703 at which data being transferred is fetched from the data transfer area associated with the transfer flag area for storing the flag. Then, at the next step 704, the flag of the transfer flag area is reset after the data being transferred is fetched. Finally, at the last step 705, the reception process is ended. Methods to drive the CPU to read out a flag from a transfer flag area include a repetitive technique to fetch the flag periodically and a technique to apply a hardware or software interrupt to the CPU when data is written into the communication area in the disk cache.

Second Embodiment

Next, a second embodiment of the present invention is explained. The second embodiment is characterized in that the CPU relies on the IOP for control of the disk cache instead of making an access directly to the disk cache. To put it in detail, the second embodiment implements a data transfer technique whereby the transmission-side CPU notifies the IOP of the address of data to be transferred and the IOP transfers the data to the reception-side CPU by way of the disk cache.

The configuration of the communication buffer in the disk cache is the same as those shown in FIGS. 4 and 5. Since the transmission-side CPU is not capable of making an access to the disk cache directly, however, data to be transferred is written into the disk cache by way of the IOP.

Figure 8:
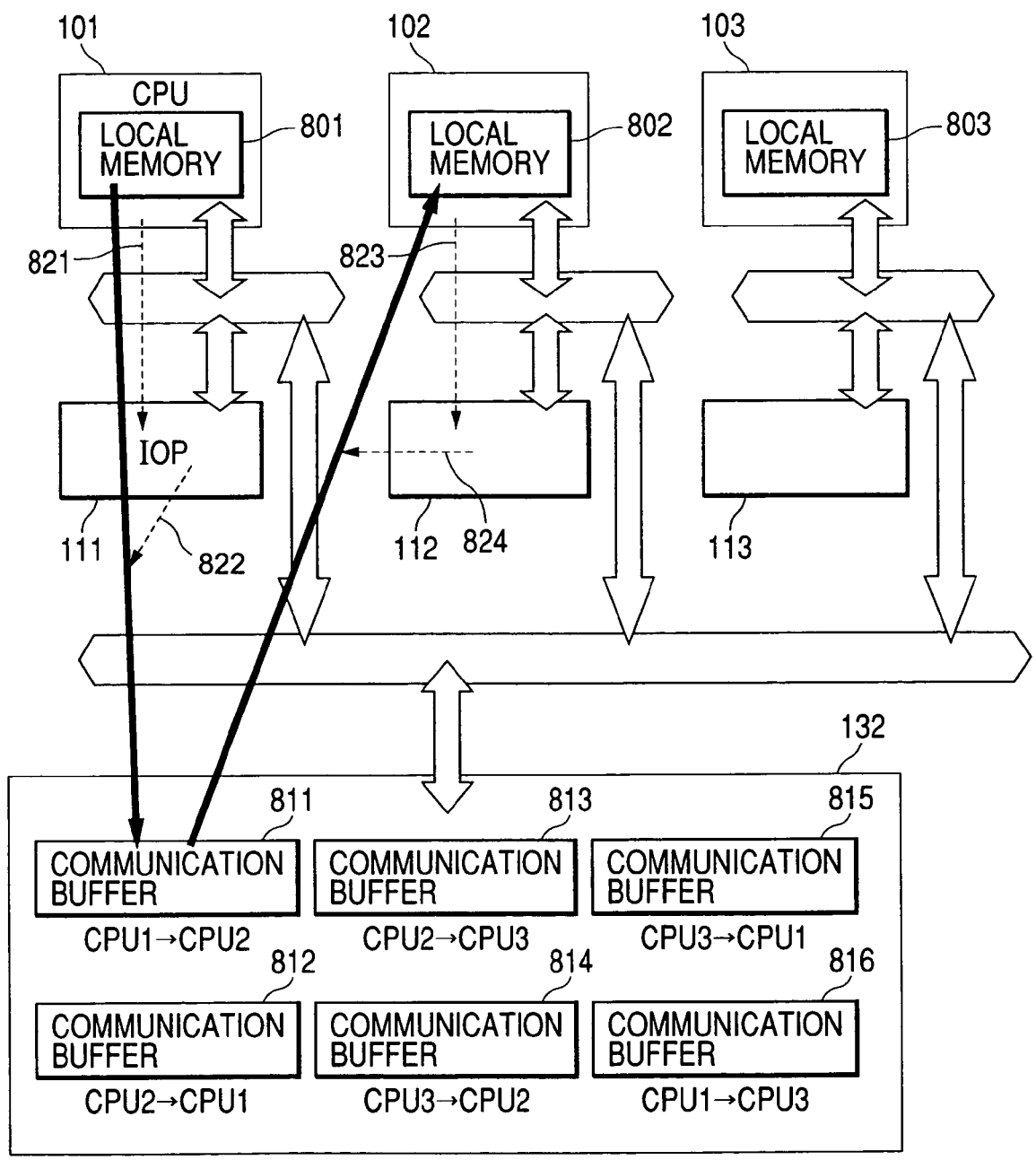
FIG. 8 is a block diagram showing a data transfer method according to another embodiment.

FIG. 8 is a diagram showing an outline of this embodiment. In an operation 821, the transmission-side CPU 101 informs the IOP 111 of an address in a local memory 801. At this address, data to be transferred has been stored. As shown in FIG. 8, typically, the local memory 801 is embedded in the transmission-side CPU 101. It is to be noted, however, that in place of the embedded local memory 801, a local memory external to the transmission-side CPU 101 may also be used for storing data to be transferred. Informed by the CPU 101, the IOP 111 copies the data to be transferred from the local memory 801 to a communication buffer 811 in the cache disk in an operation 822. In an operation 823, the reception-side CPU 102 informs the IOP 112 of an address in a local memory 802 to be used for storing the data being transferred. Informed by the CPU 102, the IOP 112 copies the data being transferred from the communication buffer 811 in the cache disk to the local memory 802 in an operation 824. The method of managing the message queue between IOPs on the transmission and reception sides is the same as that adopted in the first embodiment. That is to say, the transmission-side IOP 111 checks transfer flags in the communication buffer 811 in order to find an available slot in a search operation. The transmission-side IOP 111 then writes the data to be transferred into the available slot found in the search operation and sets the transfer flag for the slot. The reception-side IOP 112 also checks transfer flags in the communication buffer 811 in order to detect the arrival of data being transferred. As the arrival of data being transferred is detected, the data being transferred is fetched from the communication buffer 811 and stored into the local memory 802. Finally, the transfer flag is reset back to 0.

Much like a communication buffer in the disk cache, each of the local memories 801 to 803 of the CPUs 101 to 103 respectively can be treated like message queues for transmission and reception. That is to say, slots in a message queue of a local memory are used sequentially, starting from the first slot. With the local memory used in this way, a CPU no longer needs to specify the address of exchanged data in a communication request issued to the IOP. For example, the local memory 801 of the CPU 101 includes a queue for transmission from the CPU 101 to the CPU 102, a queue for transmission from the CPU 101 to the CPU 103, a queue for transmission from the CPU 101 to the CPU 103 and so on. The queue for transmission from the CPU 101 to the CPU 102 and the queue for transmission from the CPU 101 to the CPU 103 and so on correspond to respectively message queues 811, 816 and so on in the disk cache 132. In addition, the local memory 801 of the CPU 101 includes a queue for reception by the CPU 101 from the CPU 102, a queue for reception by the CPU 101 from the CPU 103, a queue for reception by the CPU 101 from the CPU 104 and so on. The queue for reception by the CPU 101 from the CPU 102 and the queue for reception by the CPU 101 from the CPU 103 and so on correspond to respectively message queues 812, 815 and so on in the disk cache 132. The configuration of each of the other local memories 802, 803 and so on is the same as the configuration of the local memory 801. When a CPU issues a request for a transmission of data to the IOP, the IOP transfers the data from a transmission queue in the local memory 801 to a slot of the corresponding transmission queue in the disk cache 132 and updates the status of the flag for the slot. As described above, the slots of a transmission queue in the local memory 801 are used sequentially in a round-robin manner in the same way as the slots of a transmission queue in the disk cache 132.

Triggered by the operation to update the flag in the message queue in the disk cache 132, the reception-side IOP writes the data being transferred into a reception buffer. To put it concretely, the reception-side IOP transfers the data from the message queue in the disk cache 132 to the corresponding queue in the local memory 802 of the reception-side CPU. In transferring the data from the message queue in the disk cache 132 to the corresponding queue in the local memory 802 of the reception-side CPU, the slots of each queue are used sequentially in a round-robin manner. Later on, the reception-side CPU issues a notice indicating that the transfer of the data has been completed.

In accordance with the configuration described above, the slots of each queue are used sequentially so that it is not necessary to specify the address of data being exchanged in a communication request issued by a CPU to an IOP. As a communication request issued by a CPU to an IOP, a special I/O command is used. An ordinary I/O command includes pieces of information such as the type of the command indicating whether the command is a read or write command, an address in the local memory of the CPU and an address in a disk. With these pieces of information used as a base, the IOP transfers data stored at the address in the local memory of the CPU to the address in the disk or, conversely, fetches data from the address in the disk and stores the data at the address in the local memory of the CPU. In this embodiment, the same interface as the ordinary I/O commands is used for special I/O commands and, in place of the read and write command types, a transmission or reception special I/O type is specified in a special I/O command so as to allow the IOP to determine that the special I/O command is a request for a communication.

In accordance with the present invention, data written in the disk cache for communication is transferred to a CPU serving as a communication partner and does not need to be copied to a disk. Thus, when receiving a special I/O command representing a request for a transmission from a transmission-side CPU, the IOP associated with the CPU carries out a special process to copy data from the transmission-side CPU to the disk cache without carrying out an I/O operation on a disk. When receiving a special I/O command representing a request for a reception from a reception-side CPU, on the other hand, the IOP associated with the CPU carries out a special process to deliver data from the disk cache to the reception-side CPU directly without carrying out an I/O operation on a disk as is the case with the request for a transmission.

As described above, a CPU issues a special I/O command to the IOP associated with the CPU to make a request for a communication. As an alternative to such a special I/O command, a CPU may issue an I/O command specifying a special address to the IOP associated with the CPU to make a request for a communication. As another alternative, as a communication device, a virtual device may be provided in place of an ordinary network device. In this case, a communication request specifying the virtual device is issued.

In the 2 embodiments described above, transmission and reception processes are handled-independently of each other. A reception process is triggered by a call to a reception function or recognition of the arrival of data being transferred. As a third embodiment, there is provided a technique, in accordance with which, after a transmission process is started, the reception-side CPU is informed of the start of the transmission process. To put it concretely, there is provided a mechanism, which is used for generating an interrupt directed to a reception-side CPU when a transmission-side CPU writes data to be transferred into the disk cache. With such a mechanism, after a transmission-side CPU stores data to be transferred into the disk cache, a write operation is carried out on an interrupt generation area to inform a reception-side CPU that the transmission-side CPU has stored data to be transferred into the disk cache.

As an alternative, a high-speed network memory or a high-speed shared memory is provided. The high-speed network memory or the high-speed shared memory has a storage capacity smaller than the disk cache. The reception-side CPU can be informed of the start of a transmission process through a high-speed path implemented by such a high-speed network memory or a high-speed shared memory. Triggered by a notification of a transmission-process start by means of an interrupt or by way of a separate path, the reception-side CPU starts a reception process.

MERITS OF THE NETWORK STORAGE SYSTEM PROVIDED BY THE INVENTION

In accordance with the present invention, a CPU is allowed to make a direct access to the disk cache's partial area used as a buffer for communications. It is thus possible to implement a communication wherein a reception-side CPU fetches transferred data, which was written by a transmission-side CPU into the communication buffer in the disk cache, from the communication buffer. The disk cache is provided as a standard component for increasing the speed of disk I/O operations and used as a memory common and accessible to all CPUs.

It is thus unnecessary to provide a new apparatus and is yet possible to allow all CPUs to carry out duplex communications. In addition, since data is transferred by way of internal buses, the data is invisible to external apparatus. Thus, secure communications are possible. Moreover, since the communication commands have the same format as the ordinary I/O command, no new interface is required.

What is claimed is:

1. An information-processing apparatus comprising:
    two or more CPUs each used for issuing I/O instructions;
    a plurality of disk apparatus for storing data;
    a disk cache for storing a copy of at least a part of data stored in said disk apparatus, which is connected to said plurality of disk apparatus and said CPUs;
    an I/O processor for receiving the I/O instructions and controlling said disk apparatus and said disk cache, which is connected to said CPUs;
    said CPUs each having a function for issuing a request to said I/O processor to allocate a partial area of said disk cache;
    said I/O processor having a function to allocate a partial area of said disk cache as a communication buffer upon reception of a request to allocate said partial area; and
    a communication means used by any particular one of said CPUs to write data into said communication buffer and by any of said CPUs other than said particular CPU to fetch said data;
    wherein said communication mean comprises;
    a sub-means for forming a judgment as to whether or not data to be transferred has been stored in said communication buffer;
    a sub-means for letting any of said CPUs store data being transferred in said communication buffer if no data to be transferred has been stored in said communication buffer;
    a sub-means for letting any of said CPUs fetch data being transferred from said communication buffer if said data being transferred has been stored in said communication buffer; and a sub-means for clearing said communication buffer;
    wherein said communication buffer is a message queue comprising a plurality of slots;
    said slots are used sequentially in a round-robin manner, starting from the first one of said slots; and
    by storing the position of one of said slots, which has been just used, the position of the following one of said slots, which is to be subjected to next-availability verification, is determined univocally at a communication time.

2. An information-processing apparatus according to claim 1 wherein:
    said I/O processor has a means for mapping a portion of said disk cache onto an address space of any specific one of said CPUs at a request made by said specific CPU; and
    said specific CPU is allowed to make an access to said disk cache by accessing said address space of said specific CPU.

3. An information-processing apparatus according to claim 1 wherein:
    said I/O processor has;
    a means for allocating a portion of said disk cache to any specific one of said CPUs at a request made by said specific CPU; and
    a means for informing said specific CPU of said allocated portion's address and size; and
    said specific CPU transmits communicated data by specifying said address and said size.

4. An information-processing apparatus according to claim 1 wherein:
    instead of making a direct access to said disk cache, any one of said CPUs informs said I/O processor of an address in a memory for storing data to be transferred; and said I/O processor makes an access to said address in said memory in order to read out said data to be transferred from said address and store said data into said communication buffer in said disk cache.

5. An information-processing apparatus according to claim 4 wherein:
    any one of said CPUs has: a means for informing said I/O processor of a read address in a memory for storing data to be transferred; and a means for informing said I/O processor of a write address in a memory to be used for storing transferred data;
    said I/O processor has: a means for copying data to be transferred from said read address to said communication buffer in said disk cache; and
    a means for copying data being transferred from said communication buffer in said, disk cache to said write address.

* * * * *

UNITED STATES PATENT AND TRADEMARK OFFICE
CERTIFICATE OF CORRECTION

| | | |
|---|---|---|
| PATENT NO. | : 7,080,128 B2 | Page 1 of 1 |
| APPLICATION NO. | : 10/638310 | |
| DATED | : July 18, 2006 | |
| INVENTOR(S) | : Sakaguchi | |

It is certified that error appears in the above-identified patent and that said Letters Patent is hereby corrected as shown below:

On The Title Page:
Item (54):

Please DELETE "Inter-Processor Communication Method using A Disk Cache in A Network Storage System"

INSERT -- Inter-Processor Communication Method Using a Shared Cache Memory in a Storage System --

Signed and Sealed this

Thirty-first Day of October, 2006

JON W. DUDAS
*Director of the United States Patent and Trademark Office*